Feb. 11, 1947. G. VAN AGTMAEL 2,415,771
TRAILER FOR BOATS
Filed Nov. 2, 1945 2 Sheets-Sheet 1

INVENTOR
GEORGE VANAGTMAEL
BY
ATTORNEY

Feb. 11, 1947.  G. VAN AGTMAEL  2,415,771
TRAILER FOR BOATS
Filed Nov. 2, 1945  2 Sheets-Sheet 2

INVENTOR.
GEORGE VANAGTMAEL
BY
ATTORNEY

Patented Feb. 11, 1947

2,415,771

UNITED STATES PATENT OFFICE 2,415,771

TRAILER FOR BOATS

George Van Agtmael, Vancouver, Wash.

Application November 2, 1945, Serial No. 626,353

5 Claims. (Cl. 214—65)

1

This invention relates to trailers for boats and is particularly adapted for transporting boats over the highway to the destination where they are to be used.

The primary object of the invention is to provide a trailer that will suspend the boat underneath the same.

A further object of the invention is to provide a sub-frame tiltably mounted within the main frame of the trailer, said sub-frame supporting the boat to be transported.

A still further object of the invention is to provide a tiltable frame within the main frame of the trailer that can be tilted about its pivot point for lowering the boat into the water or for picking the same up out of the water.

These and other incidental objects will be apparent in the drawings, specifications and claims.

Referring to the drawings:

Figure 5 is a detailed fragmentary view of the forward end of the trailer, illustrating the boat hanger and the locking mechanism for holding the sub-frame parallel to the main frame.

In the drawing:

Figure 1:
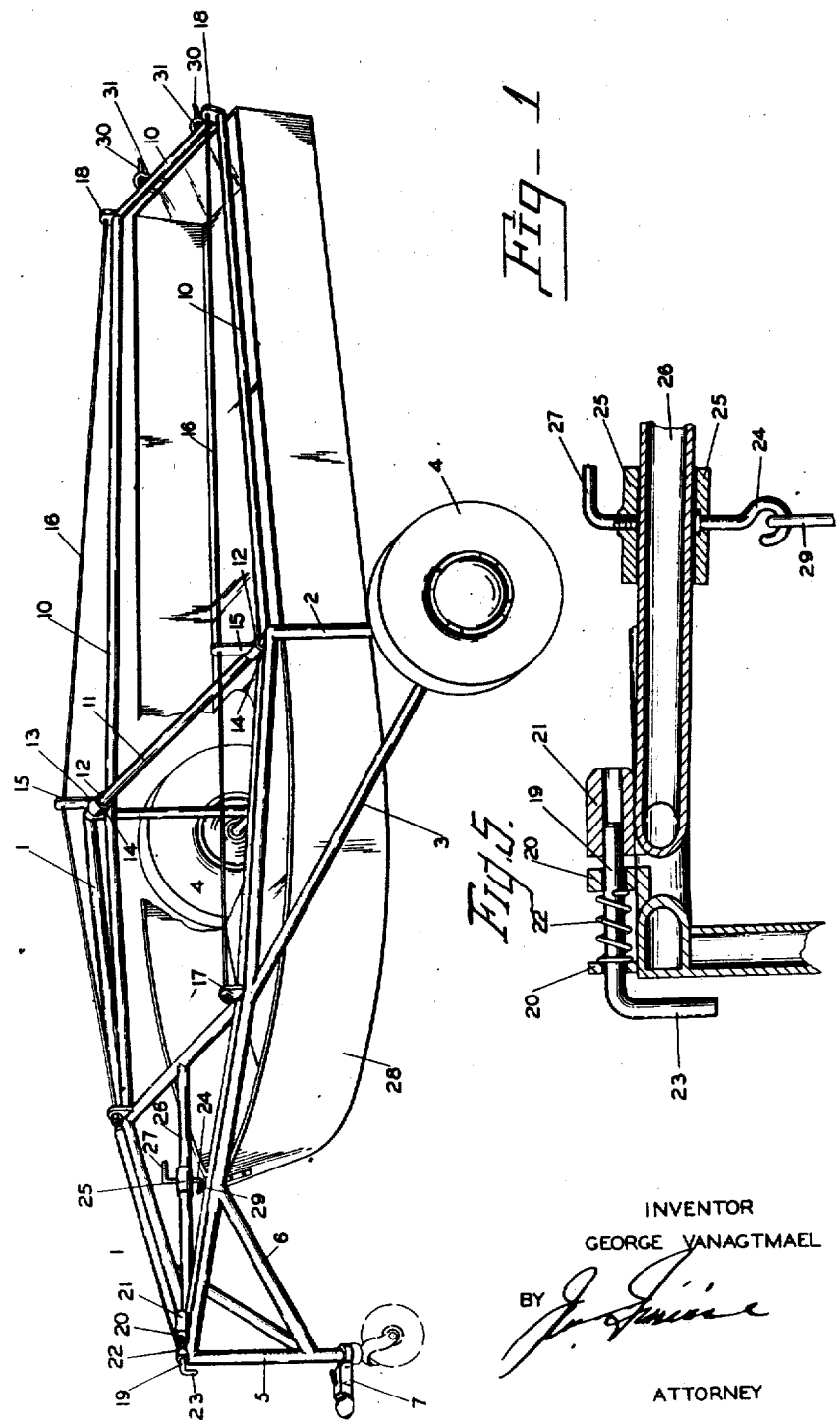
Figure 1 is a perspective side view of the trailer, having a boat suspended thereunder.

My new and improved boat trailer consists of a main frame 1, having downwardly extending legs 2 braced to the main frame by the braces 3. At the lower end of the legs 2 are journalled the wheels 4 by any suitable well known type of bearing.

Extending downwardly at the opposite end of the frame 1 is a pedestal 5, braced at 6 and having a trailer hitch fitting 7 secured to its lower end for connecting to the vehicle 8 in the usual manner at 9.

A sub-frame 10 is pivotally mounted to the cross bar 11 of the main frame 1 at 12. The bearing 13 is fixedly secured at 14 to the sub-frame 10 and is journalled to the cross shaft 11 of the main frame. Extending upwardly from the bearing point 13 is a bracket 15 through which passes a guy rod 16, one end of the guy rod 16 is adjustably mounted at 17, while the opposite end is anchored at 18, supporting and stiffening the sub-frame 10. The forward end of the sub-frame

2 is locked to the main frame 1 by locking bolt 19, which is slidably journalled within the bosses 20 forming part of the main frame.

The end of the locking bolt 19 enters the socket 21, which is fixedly mounted to the forward end of the sub-frame 10. A spring 22 maintains the locking bolt in engagement with the socket 21 while a handle 23 is provided for releasing the bolt from the socket. A hook 24 forms part of the sleeve 25, which is slidably mounted to the bar 26 and held in any desired location by the locking bolt 27.

The forward end of the boat 28 is supported by the hook 24 and suitable link connection 29. The rear of the boat is supported on hooks 30 which form part of the frame 10 by the U-shaped hangers 31, secured to the rear of the boat.

Figure 2:
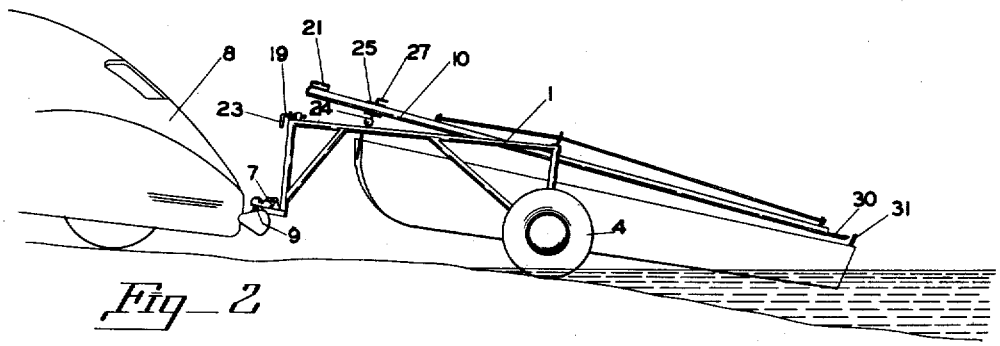
Figure 2 illustrates the trailer being backed into the water, the rear end of the boat having been released and resting in the water.

In the operation of my new and improved boat trailer, referring to Figure 2, the vehicle 8 backs the trailer down to the water's edge. The locking bolt 19 releases the forward end of the sub-frame 10 allowing it to rest as indicated. The locking bolt 27 is loosened allowing the sleeve 25 to travel rearwardly on the bar 26 releasing the hangers 31 from the hooks 30 permitting the rear of the boat to settle in the water. The forward end of the frame 10 is then pivoted downward as shown in Figure 3, at which time the front of the boat may be released from the hook 24, completely releasing the boat from the trailer.

While this method of releasing the boat may not be followed exclusively, it does illustrate how the tilting frame of the trailer handles the boat with ease.

Figure 4:
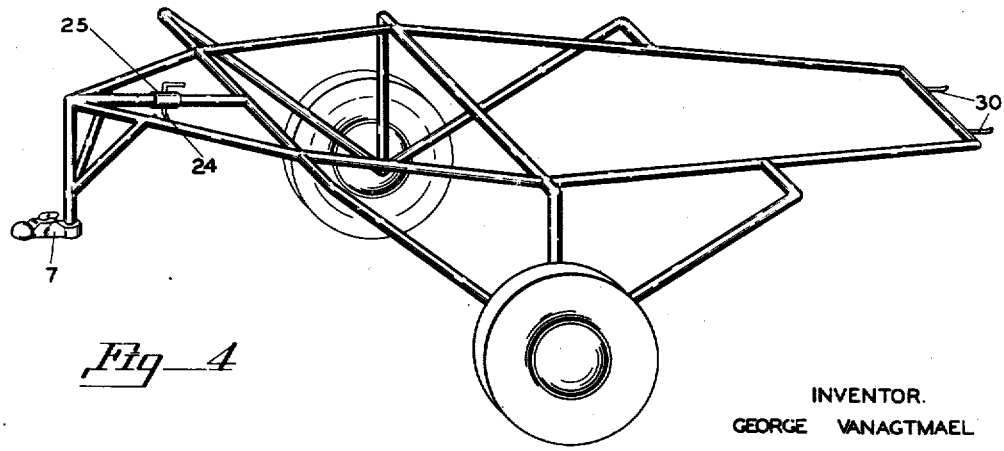
Figure 4 illustrates another preferred embodiment of my invention in a boat trailer, having a single main frame.

In Figure 4, I illustrate another preferred form of trailer wherein the sub-frame is eliminated. While this type of trailer does not have the advantages of the one just above described it does provide a simple means of transporting and supporting the boat under the trailer, which is the primary feature of my invention.

Figure 3:
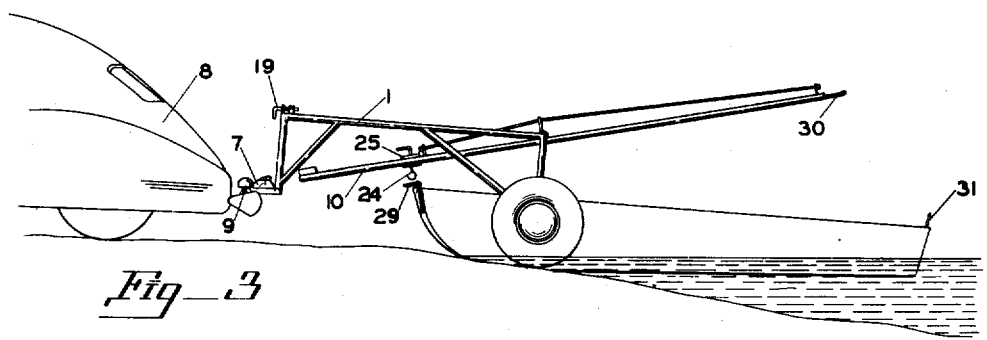
Figure 3 illustrates the boat completely released from the trailer.

The tilting of the trailer to accomplish the results above described is made possible by the releasing of the trailer hitch 7 from the vehicle and tilting the whole frame similar to the position shown by the sub-frame of the preferred form of trailers in Figures 2 and 3.

I do not wish to be limited to the exact mechanical embodiment illustrated, as other forms of mechanical equivalents may be used still coming within the scope of my claims.

I claim:

1. A boat transporting trailer including a frame, means for removably fixing the opposite ends of the boat to the frame, the frame being mounted for tilting relative to a normal boat carrying position, the securing means at one end of the frame automatically releasing the boat under such tilting of the frame, the releasing means at the other end of the boat being manually operable, to permit the securing means at the front end of the frame to slide when released to automatically release the boat support at the rear end of the frame.

2. A boat transporting trailer, including a main frame, ground-traveling means therefor, an auxiliary frame swingingly supported by the main frame and extending rearwardly beyond the main frame, a rear boat-support carried by the auxiliary frame, a front boat-support carried by the auxiliary frame, and manually operable means to selectively prevent or permit swinging movement of the auxiliary frame relative to the main frame, to support or automatically release the boat.

3. A trailer for boats, comprising a frame, having downwardly extending supporting legs on one of its ends, wheels journalled to the lower ends of these legs, a downwardly extending pedestal at its opposite end terminating in a trailer hitch connection, a sub-frame pivotally mounted midway its length to the main frame above the wheeled supports, a locking means on one of its ends for holding it in a horizontal position relative to the main frame, supporting hangers on the underside of both ends of the sub-frame for supporting a boat thereunder.

4. A boat transporting trailer, including a main frame having a cross bar, wheels supporting the main frame, an auxiliary frame pivotally mounted on the main frame and extending rearwardly of the cross bar and wheels, means at the rear of the auxiliary frame for supporting the rear of a boat, means at the forward end of the auxiliary frame for supporting the front of the boat, and means at the front ends of the main and auxiliary frames for securing said two frames together.

5. A boat transporting trailer, including a V-shape frame with a cross bar, front and rear standards depending from the V-frame, wheels mounted on the rear standards, a hitch at the lower end of the front standard, an auxiliary frame swingingly mounted on the cross bar and extending rearwardly beyond the V-frame, a slidable boat support mounted on the forward part of the auxiliary frame, boat supports at the rear end of the auxiliary frame, and means connecting the forward ends of the main and auxiliary frames.

GEORGE VAN AGTMAEL.

REFERENCES CITED

The following references are of record in the file of this patent:

UNITED STATES PATENTS

| Number | Name | Date |
| --- | --- | --- |
| 2,260,676 | Lafaye | Oct. 28, 1941 |
| 2,321,198 | Graves | June 8, 1943 |
| 2,164,550 | Steward | July 4, 1939 |
| 1,870,573 | Kuchar | Aug. 9, 1932 |
| 1,531,180 | Erickson | Mar. 24, 1925 |
| 1,655,454 | Clay | Jan. 10, 1928 |
| 2,282,506 | Wachter | May 12, 1942 |
| 2,388,870 | Sackett | Nov. 13, 1945 |
| 1,779,887 | Melanson | Oct. 28, 1930 |
| 2,375,754 | Ballinger | May 15, 1945 |